(12) United States Patent
Gorday et al.

(10) Patent No.: US 7,675,983 B2
(45) Date of Patent: Mar. 9, 2010

(54) MITIGATION OF DC DISTORTION IN OFDM RECEIVERS

(75) Inventors: Robert M. Gorday, W. Palm Beach, FL (US); Mahibur Rahman, Lake Worth, FL (US)

(73) Assignee: Freescale Semiconductor, Inc., Austin, TX (US)

( * ) Notice: Subject to any disclaimer, the term of this patent is extended or adjusted under 35 U.S.C. 154(b) by 826 days.

(21) Appl. No.: 11/404,350

(22) Filed: Apr. 14, 2006

(65) Prior Publication Data

US 2007/0242599 A1    Oct. 18, 2007

(51) Int. Cl.
  H04K 1/10      (2006.01)
  H03D 1/04      (2006.01)
  H04J 1/02      (2006.01)
  H04J 11/00     (2006.01)

(52) U.S. Cl. .................. 375/260; 375/346; 370/208; 370/497

(58) Field of Classification Search ................ 370/208, 370/206; 714/790; 375/308; 455/305
See application file for complete search history.

(56) References Cited

U.S. PATENT DOCUMENTS

| | | | | |
|---|---|---|---|---|
| 4,496,907 A * | 1/1985 | Funk et al. | ................. | 324/445 |
| 5,099,366 A * | 3/1992 | Ahlgrim | ...................... | 360/67 |
| 5,157,395 A * | 10/1992 | Del Signore et al. | ........ | 341/143 |
| 5,428,836 A * | 6/1995 | Sanecki et al. | ............... | 455/315 |
| 5,455,537 A * | 10/1995 | Larkin et al. | ................... | 330/52 |
| 5,557,642 A * | 9/1996 | Williams | .................... | 375/316 |
| 6,108,810 A * | 8/2000 | Kroeger et al. | ............. | 714/790 |
| 6,160,443 A * | 12/2000 | Maalej et al. | ................ | 329/304 |
| 6,222,891 B1* | 4/2001 | Liu et al. | ..................... | 375/326 |
| 6,240,100 B1* | 5/2001 | Riordan et al. | .............. | 370/442 |
| 6,292,518 B1* | 9/2001 | Grabb et al. | ................ | 375/321 |
| 6,301,298 B1* | 10/2001 | Kuntz et al. | ................ | 375/232 |
| 6,449,320 B1* | 9/2002 | Lindoff | ...................... | 375/319 |
| 6,459,741 B1* | 10/2002 | Grabb et al. | ................ | 375/261 |
| 6,539,062 B1* | 3/2003 | Grabb et al. | ................ | 375/261 |
| 6,549,561 B2* | 4/2003 | Crawford | .................... | 375/137 |
| 6,549,583 B2* | 4/2003 | Crawford | .................... | 375/260 |
| 6,560,447 B2 | 5/2003 | Rahman et al. | | |
| 6,606,359 B1 | 8/2003 | Nag et al. | | |
| 6,606,724 B1* | 8/2003 | Krieger et al. | .............. | 714/755 |
| 6,633,616 B2* | 10/2003 | Crawford | .................... | 375/326 |
| 6,665,355 B1* | 12/2003 | Chen et al. | .................. | 375/321 |
| 6,714,776 B1* | 3/2004 | Birleson | ...................... | 455/302 |
| 6,724,331 B1* | 4/2004 | El-Ghoroury et al. | ....... | 341/118 |
| 6,725,024 B1* | 4/2004 | Lindoff et al. | .............. | 455/255 |
| 6,757,272 B1* | 6/2004 | Abeta et al. | ................. | 370/342 |
| 6,831,900 B2* | 12/2004 | Blake | ......................... | 370/289 |
| 6,836,646 B2* | 12/2004 | Nagasaka | .................... | 455/126 |
| 6,853,681 B1* | 2/2005 | Lindoff | ...................... | 375/231 |
| 6,931,343 B2* | 8/2005 | Webster et al. | .............. | 702/107 |

(Continued)

*Primary Examiner*—Seema S Rao
*Assistant Examiner*—Steven Wood
(74) *Attorney, Agent, or Firm*—Charles W. Bethards

(57) ABSTRACT

A baseband receiver and corresponding methods are arranged and configured to mitigate effects of direct current (DC) distortion and process an Orthogonal Frequency Division Multiplexing (OFDM) signal as provided from a direct conversion radio or receiver. The baseband receiver includes an OFDM demodulator configured to demodulate the OFDM signal, a post processor coupled to the OFDM demodulator and configured to provide symbols corresponding to the OFDM signal, and a compensator coupled to at least one of the OFDM demodulator and the post processor and configured to reduce error rates out of the baseband receiver that result from DC distortion in the direct conversion radio.

16 Claims, 8 Drawing Sheets

U.S. PATENT DOCUMENTS

| | | | |
|---|---|---|---|
| 6,952,394 B1* | 10/2005 | Kim et al. | 370/208 |
| 6,970,717 B2* | 11/2005 | Behrens et al. | 455/553.1 |
| 7,003,100 B2* | 2/2006 | Lai et al. | 379/406.1 |
| 7,020,226 B1* | 3/2006 | Kirkland | 375/355 |
| 7,024,221 B2* | 4/2006 | Paulus et al. | 455/553.1 |
| 7,039,124 B2* | 5/2006 | Lee | 375/296 |
| 7,046,744 B2* | 5/2006 | Ho et al. | 375/340 |
| 7,054,296 B1* | 5/2006 | Sorrells et al. | 370/338 |
| 7,061,855 B2* | 6/2006 | Weste et al. | 370/208 |
| 7,072,381 B2* | 7/2006 | Atarashi et al. | 375/144 |
| 7,106,689 B1* | 9/2006 | Sudo | 370/208 |
| 7,167,530 B2* | 1/2007 | Koomullil et al. | 375/329 |
| 7,184,714 B1* | 2/2007 | Kutagulla et al. | 455/73 |
| 7,248,625 B2* | 7/2007 | Chien | 375/219 |
| 7,260,054 B2* | 8/2007 | Olszewski | 370/208 |
| 7,266,359 B2* | 9/2007 | Chen et al. | 455/296 |
| 7,283,598 B2* | 10/2007 | Akita et al. | 375/316 |
| 7,307,480 B2* | 12/2007 | Shiu et al. | 331/44 |
| 7,313,376 B1* | 12/2007 | Hietala | 455/232.1 |
| 7,355,960 B2* | 4/2008 | Kang et al. | 370/208 |
| 7,366,089 B2* | 4/2008 | Tehrani et al. | 370/208 |
| 7,392,450 B2* | 6/2008 | Lin | 714/747 |
| 7,403,760 B1* | 7/2008 | Gao | 455/312 |
| 7,430,257 B1* | 9/2008 | Shattil | 375/347 |
| 7,477,885 B2* | 1/2009 | Rostami et al. | 455/284 |
| 2002/0150059 A1* | 10/2002 | Blake | 370/286 |
| 2002/0155822 A1* | 10/2002 | Adachi | 455/293 |
| 2002/0166124 A1* | 11/2002 | Gurantz et al. | 725/78 |
| 2003/0012305 A1* | 1/2003 | Auranen | 375/316 |
| 2003/0099208 A1* | 5/2003 | Graziano et al. | 370/286 |
| 2003/0133518 A1* | 7/2003 | Koomullil et al. | 375/326 |
| 2003/0179837 A1* | 9/2003 | Ide et al. | 375/324 |
| 2004/0037366 A1* | 2/2004 | Crawford | 375/295 |
| 2004/0203472 A1* | 10/2004 | Chien | 455/68 |
| 2004/0217753 A1* | 11/2004 | Yamanaka et al. | 324/76.21 |
| 2004/0228418 A1* | 11/2004 | Brotje et al. | 375/260 |
| 2004/0233838 A1* | 11/2004 | Sudo et al. | 370/208 |
| 2004/0258171 A1* | 12/2004 | Akita et al. | 375/260 |
| 2005/0058227 A1* | 3/2005 | Birkett et al. | 375/329 |
| 2005/0078649 A1* | 4/2005 | Tehrani et al. | 370/343 |
| 2005/0117670 A1* | 6/2005 | Webster et al. | 375/330 |
| 2005/0184801 A1* | 8/2005 | Gai et al. | 330/9 |
| 2005/0232135 A1* | 10/2005 | Mukai et al. | 370/208 |
| 2005/0265498 A1* | 12/2005 | Gunzelmann et al. | 375/350 |
| 2006/0039550 A1* | 2/2006 | Chadha et al. | 379/406.09 |
| 2006/0209745 A1* | 9/2006 | MacMullan et al. | 370/328 |
| 2006/0217069 A1* | 9/2006 | Chen et al. | 455/63.1 |
| 2006/0223457 A1* | 10/2006 | Rahman | 455/78 |
| 2006/0240779 A1* | 10/2006 | Rostami et al. | 455/63.1 |
| 2007/0217530 A1* | 9/2007 | Hosseinian et al. | 375/260 |
| 2007/0242599 A1* | 10/2007 | Gorday et al. | 370/208 |

* cited by examiner

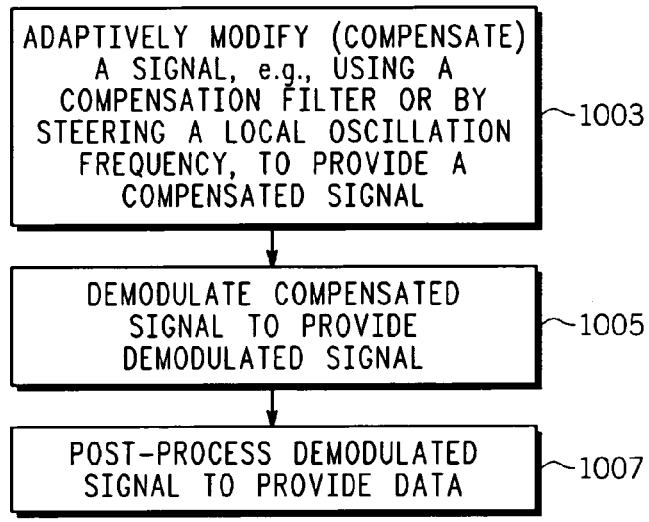
FIG. 10  1000
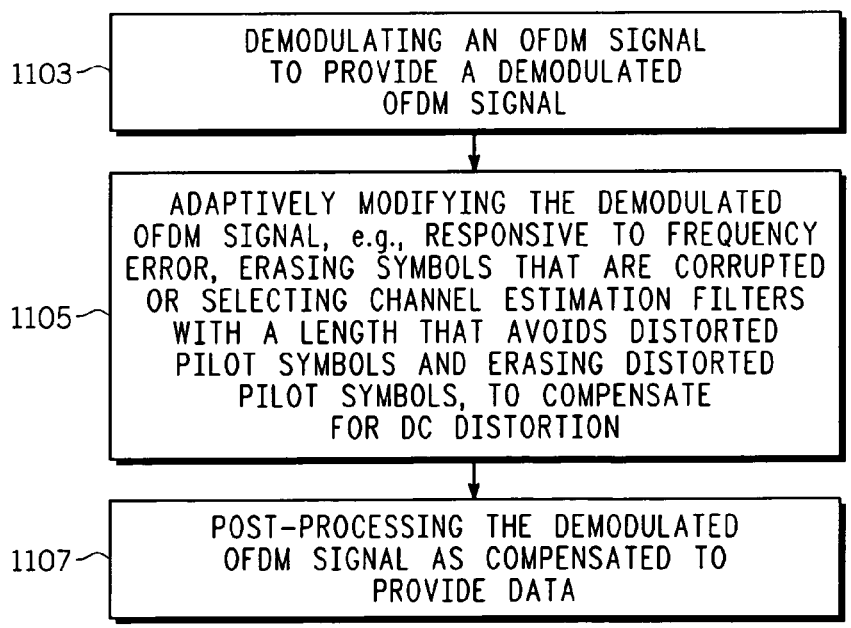
1100  FIG. 11

MITIGATION OF DC DISTORTION IN OFDM RECEIVERS

FIELD OF THE INVENTION

This invention relates in general to methods and apparatus for mitigating or otherwise decreasing adverse effects of DC (direct current) distortion on an Orthogonal Frequency Division Multiplexing (OFDM) signal that is received by a direct conversion radio receiver.

BACKGROUND OF THE INVENTION

Direct conversion radios or radio frequency (RF) receivers are known. Direct conversion radios or RF receivers convert an RF signal directly to a baseband signal at a center frequency of zero or near zero Hz (Hertz) via one or more mixing processes. Direct conversion receivers may alternatively be referred to as zero-IF (intermediate frequency) receivers. Practitioners often use direct conversion receivers as they typically facilitate the use of digital signal processing techniques for much of the filtering and demodulation functions or processes that are required to properly receive information or data that is carried by the RF signal.

One problem with direct conversion receivers is that even small mismatches or the like in low level portions (e.g., quadrature mixers) of the receiver will typically result in a DC component including DC offset and low frequency (sometimes referred to as DC) noise in the baseband signal. The DC offset and DC noise can degrade the dynamic range as well as signal to noise performance of the receiver. Therefore, practitioners typically use a notch filter, high pass filter, or feedback loop (DC offset correction loop) to remove the DC offset and low frequency or DC noise. Unfortunately the removal of these components can result in low frequency or DC distortion of the baseband signal. Depending on the characteristics of the baseband signal the DC distortion can result in increased error rates in signals that are being received.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 10 shows one representative embodiment of a method of reducing effects of DC distortion in an OFDM signal in accordance with various embodiments; and FIG. 11 depicts another representative embodiment of a method of reducing effects of DC distortion in an OFDM signal in accordance with various embodiments.

DETAILED DESCRIPTION

Figure 1:
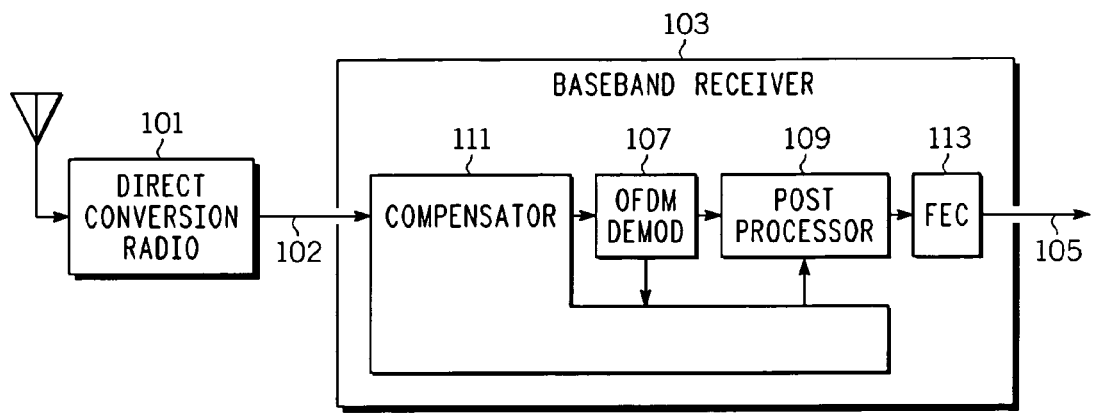
FIG. 1 depicts in a simplified and representative form, a high level block diagram of a direct conversion OFDM receiver including a compensator in accordance with one or more embodiments.

In overview, the present disclosure concerns mitigation of or compensation for adverse impacts of direct current (DC) distortion that can be present in and adversely impact or effect a signal such as an Orthogonal Frequency Division Multiplexing OFDM signal, e.g., an OFDM signal as provided from a direct conversion radio or direct conversion radio frequency receiver. More specifically techniques and apparatus for mitigating or otherwise reducing effects of DC distortion on a signal, e.g., an OFDM signal, that are arranged and constructed for use in conjunction with OFDM signal demodulation will be discussed and disclosed.

The OFDM signals of particular interest may vary widely but include DVBT (Digital Video Broadcast—Terrestrial) and DVBH (Digital Video Broadcast—Handheld) or other OFDM signals that are received via a direct conversion radio where the OFDM signal may be subject to DC distortion or other forms of distortion that have characteristics that are subject to compensation. Systems, equipment and devices that include or utilize apparatus and methods to receive or demodulate OFDM signals or otherwise process OFDM or like signals with content in the vicinity of or otherwise subject to one or more forms of distortion can advantageously utilize, the inventive concepts and principles disclosed in the present application provided the methods or apparatus are practiced in accordance with or as taught herein.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in integrated circuits (ICs) including possibly application specific ICs or ICs with integrated processing controlled by embedded software or firmware. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts of the various embodiments.

Referring to FIG. 1, a simplified and representative high level block diagram of a zero-IF of direct conversion OFDM receiver including a compensator in accordance with one or more embodiments will be briefly discussed and described. FIG. 1 illustrates a generally known radio frequency (RF) receiver and more specifically a direct conversion radio 101 that converts an RF signal at a corresponding frequency that is coupled to the direct conversion radio 101 by an antenna to a baseband signal, e.g., an OFDM signal, at 102. Generally for this disclosure, the situation where the RF signal is modulated by an OFDM signal and the RF radio directly converts the RF signal to baseband will be discussed and described; however it is understood that the inventive concepts and principles apply to other signals and modulation schemes where the signals are subject to systematic distortion. The OFDM signal at 102 is coupled to a baseband receiver 103.

The baseband receiver 103 is arranged and configured to mitigate effects of direct current (DC) distortion and process a signal, e.g., an Orthogonal Frequency Division Multiplexing (OFDM) signal, as provided from the direct conversion radio 101. The base band receiver includes in one or more embodiments, an OFDM demodulator 107 that is configured to demodulate the OFDM signal and a post processor 109 that is coupled to the OFDM demodulator 107 and configured to provide symbols corresponding to the OFDM signal. Further included and described in detail below is a compensator 111 that can take various forms and is coupled to at least one of the OFDM demodulator 107 and the post processor 109 and configured to reduce error rates out of the baseband receiver that result from DC distortion in the direct conversion radio. The symbols from the post processor 109 are coupled to a forward error corrector (FEC) 113 which performs forward error correction and provides hard data at 105. Thus, the baseband receiver is coupled to the OFDM signal from the direct conversion radio 101 and operates to provide OFDM demodulation and provides symbols or data that was transported by the OFDM subcarriers.

Figure 2:
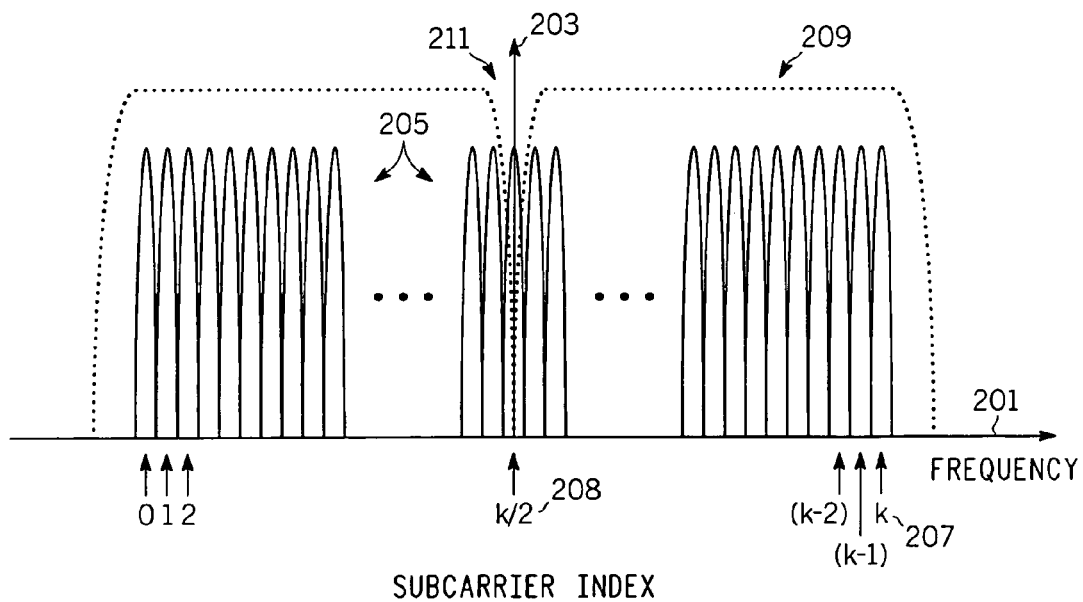
FIG. 2 in a representative form, shows a diagram of a representative OFDM signal and various sources of DC distortion in a direct conversion radio portion of the FIG. 1 OFDM receiver.

Referring to FIG. 2, a diagram of a representative OFDM signal and various sources of DC distortion in a direct conversion radio portion of the FIG. 1 OFDM receiver will be discussed and described. FIG. 2 depicts complex frequency (negative and positive) along the horizontal axis 201 and relative amplitude on the vertical axis 203. The OFDM signal, shown at base band, i.e., prior to or after conversion from the RF carrier frequency, is comprised of a multiplicity of subcarriers 205 where these subcarriers are each orthogonal to all others and each are modulated in accordance with the applicable air interface conventions or standards. In FIG. 2 there are k+1 subcarriers labeled as subcarrier 0 through subcarrier k 207. Note that when k is an even number, e.g., as is the convention in many DVB (Digital Video Broadcast) standards, there will be an odd number of subcarriers and thus the k/2 208 subcarrier will fall at 0 hertz (Hz) at the output of the receiver if there is 0 Hz frequency error.

The specific number of subcarriers and their relative spacing and bandwidth will depend on the particulars of the governing air interface standard or mode of operation according to that standard. For example, in one DVB standard, normally referred to as DVBH (DVB Handheld), scaleable bandwidth is utilized and in one mode 6817 subcarriers are used where the subcarriers are spaced at 1 KHz with subcarriers modulated according to either quadrature phase shift keying (QPSK), 16 quadrature amplitude modulation (16 QAM), or 64 QAM. IN an alternative mode 1705 subcarriers are used with the subcarriers spaced at 4 KHz and modulated according to either QPSK or 16 QAM.

Also shown is a representative base band filter response 209 where this filter is used to provide basic selectivity for the OFDM signal as well as rejection of low frequency or DC noise, etc. Many direct conversion radios or receivers also include a high pass notch filter with a high pass response 211 that is used to further reduce any DC distortion or other low frequency components, e.g., low frequency noise elements or components which limit the dynamic range of the baseband receiver. As shown in representative form one or more of the subcarriers will be dramatically attenuated by the direct conversion notch filter as well as base band filter. The actual effect or impact of these filters will of course depend on the specifics for a particular direct conversion radio and the associated notch filter and base band filter. A typical amplitude characteristic associated with these filters can have a 3 dB rejection at or near 1 KHz, however even in this instance the phase response, i.e., group delay, of these filters can have a significant effect, e.g., 50 degree or more phase shift up to frequencies near 5 KHz and 15 degree or more shift, up to frequencies near 10 KHz. In this instance 20 of the 1 KHz subcarriers can be effected by the reduction or elimination of the DC elements (DC distortion) of the OFDM signal as provided by a direct conversion radio or receiver. This distortion of 20 of the subcarriers can reduce the performance of the OFDM receiver.

Figure 3:
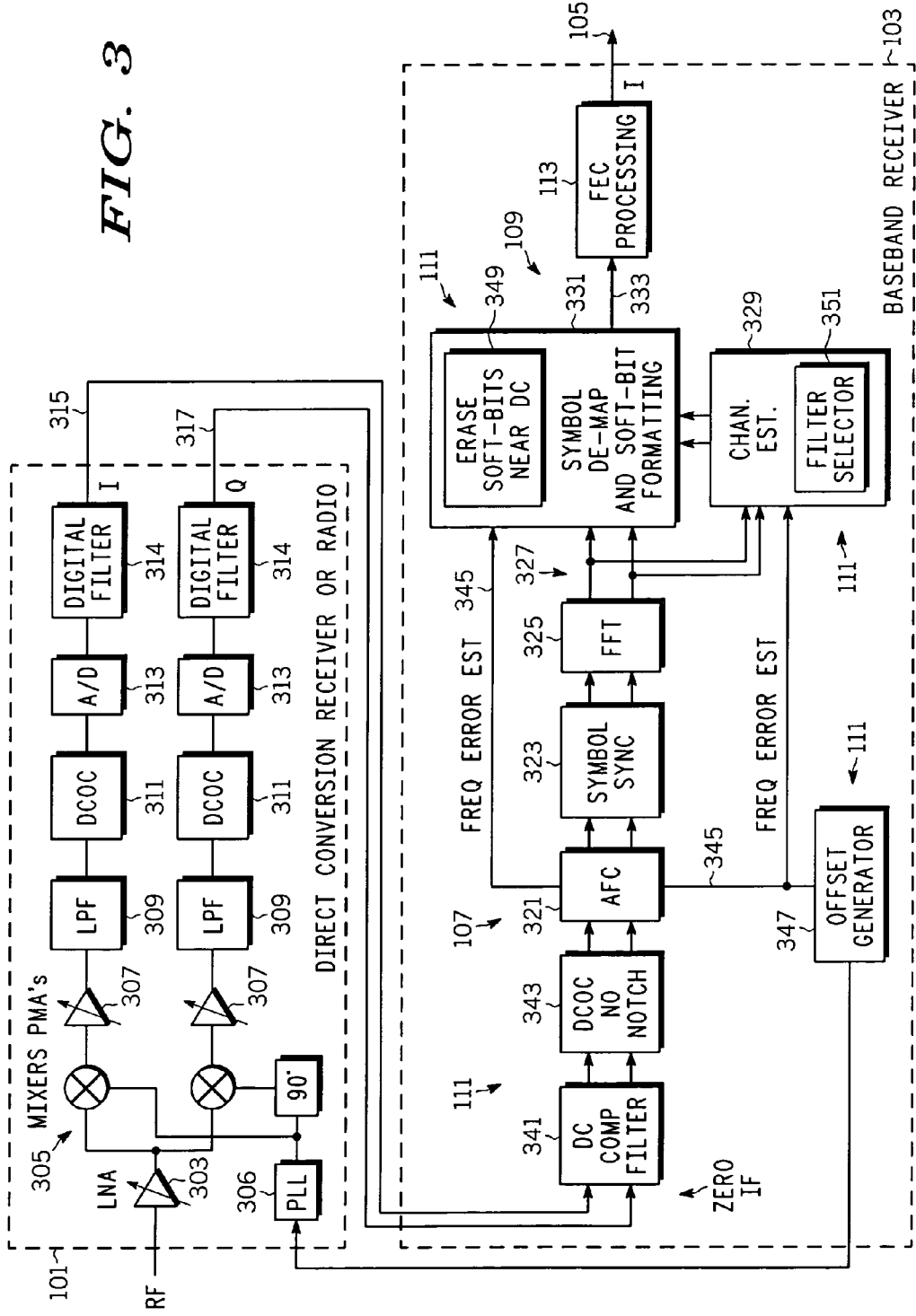
FIG. 3 depicts a representative and more detailed block diagram of the FIG. 1 OFDM receiver with compensator in accordance with one or more embodiments.

Referring to FIG. 3, a representative and more detailed block diagram of the FIG. 1 OFDM receiver with compensator in accordance with one or more embodiments will be discussed and described. FIG. 3 shows the direct conversion radio 101 coupled to the baseband receiver 103. The baseband receiver 103 includes OFDM demodulator 107, post processor 109, compensator 111, and FEC 113. The compensator as shown can be comprised of one or more of various circuits or functions that are configured to perform one or more corresponding compensation processes or operations.

The direct conversion receiver or radio 101 is generally known and includes a low noise amplifier (LNA) 303 that is coupled to and amplifies an RF signal, e.g., as provided from an antenna. The LNA 303 may have a variable gain that is controlled to limit the amplitude range of an output signal for the remainder of the radio. The output RF signal from the LNA 303 is coupled to a complex or quadrature mixer 305 that is driven by a phase locked loop (PLL) 306 (specifically voltage controlled oscillator (VCO)—not specifically shown) and operates to down convert the RF signal to base band. Generally the PLL is known and includes a VCO operating in a phase locked loop configuration and may include one or more multipliers or mixers. The PLL loop may alternatively be referred to herein as a frequency synthesizer or local oscillator. The PLL or local oscillator provides a signal with a frequency that is equal to the carrier or center frequency of the RF signal and thus provides a base band signal similar to that depicted in FIG. 2. Note that the output of the quadrature mixer 305 is a complex signal with both an in phase (I) component, e.g., upper path, and a quadrature (Q) component, e.g., lower path, as depicted. The two paths are amplified by post mixer amplifiers 307 that can be variable gain amplifiers arranged to limit the amplitude of output signals from the amplifiers. After amplification the signals are coupled to low pass filters 309 which are used to provide selectivity, e.g., reject adjacent channel and higher order mixing products and the like. The low pass filters 309 will vary with the specifics of the air interface but in one or more embodiments include a $4^{th}$ order plus an $8^{th}$ order filter with programmable bandwidths of 5, 6, 7, and 8 MHz. The particular bandwidth is typically selected depending on local conditions and adjacent channel signals, e.g., conditions that may vary depending on the country where the radio is operating.

From the low pass filters 309, I and Q signals are coupled to a DCOC (DC Offset Correction) operation or circuits 311 where any DC offset or DC voltage is removed. This can be performed as will be appreciated by those of ordinary skill with a high pass filter or with other forms of DC offset correction loops, one result of which can be at least a portion of the DC distortion noted in the discussions regarding FIG. 2. Generally, the DCOC circuits produce a distinct high pass magnitude response (with associated group delay distortion near its bandwidth) depending upon the order and type of the high pass filter. The outputs of the DCOC circuits or function 311 and corresponding signals are coupled to analog to digital converters (ADC) 313. The ADC 313 converts the analog signals at the inputs to digital signals that in some embodiments are provided at 10.16666 MS/s (million samples per second) rate for the I and the Q signal, where each sample is a 10 bit sample. Note that the low pass filters 309 and DCOC 311 are configured and operate to remove large signals, other than the desired or on channel signal, at the input to the ADC 313, thus insuring that the full dynamic range of the ADC is devoted to converting the desired signal to a corresponding digital signal. The output digital I and Q signals can be coupled to a digital filter 314 to provide additional adjacent channel rejection when needed. The outputs from the digital filter or filters 314 are coupled at 102 to the baseband receiver 103. Specifically, the I signal at 315 and the Q signal at 317 in digital form are coupled to the baseband receiver 103.

It is noted that the direct conversion radio through the ADC 313 is often implemented in one integrated circuit (IC) or on one IC die while all other functions including the digital filters 314 and the baseband receiver are implemented as an IC or on a second IC die.

The baseband receiver as noted above comprises the OFDM demodulator 107 coupled to a post processor 109, a compensator 111 coupled in various embodiments to one or both the OFDM demodulator 107 and the post processor 109, and a FEC 113 that is coupled to the post processor 109 and provides hard data at 105. More specifically the OFDM demodulator 107 includes an automatic frequency controller (AFC) 321 coupled to a symbol synchronizer 323 which is then coupled to a Fast Fourier Transform (FFT) engine 325. The AFC 321 operates as is known to estimate and compensate for any frequency error between the transmitted frequency and the PLL frequency (essentially multiplies the OFDM signal by a complex sinusoid with an argument that depends on the estimated frequency error). The symbol synchronizer operates as known to determine any time offset between the receiver and the transmitter and thus insure that the beginning of an ODFM symbol is found or determined and used by the FFT engine 325 to perform an FFT and thereby produce output signals or symbols at 327 for each of the subcarriers, e.g., as shown in FIG. 2.

The output signals are coupled to the post processor 109. The post processor includes a channel estimator 329 as well as a symbol de-mapper 331. The signals or symbols from the FFT engine 325 at 327 are coupled to the channel estimator 329. In OFDM systems a portion of the transmitted signal is normally devoted to sending pilot symbols and these as received are used to estimate the channel response over both time and frequency. Additional details for the pilot symbols for one OFDM system or air interface standard will be described below. Generally, the channel estimator performs these operations and provides various inputs concerning channel estimation to the symbol de-mapper 331. The symbol de-mapper uses the signals or symbols as received together with the channel estimation information to de-map the sub-carrier symbols (i.e. convert 64 QAM symbols or the like to bits) and provide essentially soft symbols or bits to the FEC 113 at 333. Note and as known that a soft bit may be viewed as a number between values representing, e.g., logic 0 and logic 1, where the value is indicative of a confidence in the soft decision. For example a 0.9 may reflect high confidence that the bit is a 1 whereas −0.2 may reflect low confidence that the bit is a 0 and an 0.0 would be viewed as an erasure or no indication of whether the bit is a logic 0 or logic 1. The soft bits or symbols are provided to the FEC 113 where forward error correction as specified by the air interface standard is performed and hard bits or symbols are provide. For example, the FEC may perform convolutional code decoding (inner code—as in closest to the channel) followed by Reed-Soloman decoding (outer code) etc. Practitioners may speak of bit error rates that result from each of these decoding steps, i.e., CCBER refers to error rates for the inner or convolutional decoding while RS-BER refers to error rates from the outer or Reed-Soloman decoding.

The compensator 111 is comprised of one or more of four circuits or operations and these can be used in various embodiments in essentially any combination to mitigate or reduce effects of DC distortion on an OFDM signal as provided from, e.g., a direct conversion radio. The effects of such DC distortion are normally an increase in error rates, e.g., CCBER or RS-BER. After an introduction and overview of each of the circuits or corresponding operations or functions, a more detailed discussion will be provided below with reference to additional figures.

The compensator 111 can include a compensation filter 341 coupled to the OFDM signal with an output of the compensation filter coupled to an input of the OFDM demodulator. In various embodiments, the compensation filter is configured to have a response that is the inverse of the low frequency response of the direct conversion radio. In certain embodiments, the compensation filter 341 further comprises a DC compensation filter configured to substantially remove attenuation, phase shift, etc. due to a high pass response of the direct conversion radio (e.g., from a notch filter, DCOC, or other high pass filter) and a DC offset corrector 343 where the DC offset corrector operates or functions possibly cooperatively or in conjunction with the DC compensation filter so as to avoid creating DC distortion, i.e., in some embodiments estimates a DC offset prior to receiving or processing an OFDM packet and then applies the estimate while the OFDM packet is received.

The compensator 111 can also include in some embodiments an automatic frequency controller, e.g., AFC 321 and an offset generator 347 that are inter coupled and collectively configured to steer a local oscillator frequency, e.g., the PLL frequency or derivative thereof, of the direct conversion radio so as to change the location in frequency of the DC distortion. The offset generator 347 is responsive to an estimate of frequency error available at 345 from the AFC 321 and further configured to steer the local oscillator frequency such that adjacent pilot subcarriers in the OFDM signal are substantially equally distant from zero (0) hertz. The offset generator is coupled to the PLL 306 and used to change divisors in the PLL such that the VCO associated with the PLL operates at or provides a local oscillator frequency to the mixers 305 that results in moving the subcarriers as indicated.

In other or additional embodiments, the compensator 111 further comprises a symbol de-mapper, e.g., de-mapper 331, which can be additionally configured to set soft symbols to an erasure, via symbol eraser 349, when the soft symbols are from subcarriers that have been subjected to the DC distortion. The symbol de-mapper, in various embodiments, is coupled to a frequency error estimate available at 345 and the frequency error estimate is used to determine what subcarriers have been subjected to the DC distortion and thus which soft symbols to set to an erasure, e.g., 0 or the like.

The compensator 111 in some embodiments further comprises a selector 351 or filter selector that is responsive to an estimate of frequency error available from the AFC 321 at 345 and is configured to select channel estimation filters where one or more particular filters are selected in accordance with a subcarrier spacing relative to the DC distortion. As shown the selector can be part of the channel estimator 329. More specifically in some embodiments, the one or more particular filters are selected to have a filter length that is shorter when a subcarrier is closer to the DC distortion than when the subcarrier is further from the DC distortion. These filters once selected are used as interpolation filters by the channel estimator 329 to perform the channel estimation. In some embodiments, the compensator 111, specifically the channel estimator is configured to erase pilot symbols (used to estimate the channel) that have been impacted by the DC distortion before using the channel estimation filters to determine characteristics of a channel for the OFDM signal.

Figure 4:
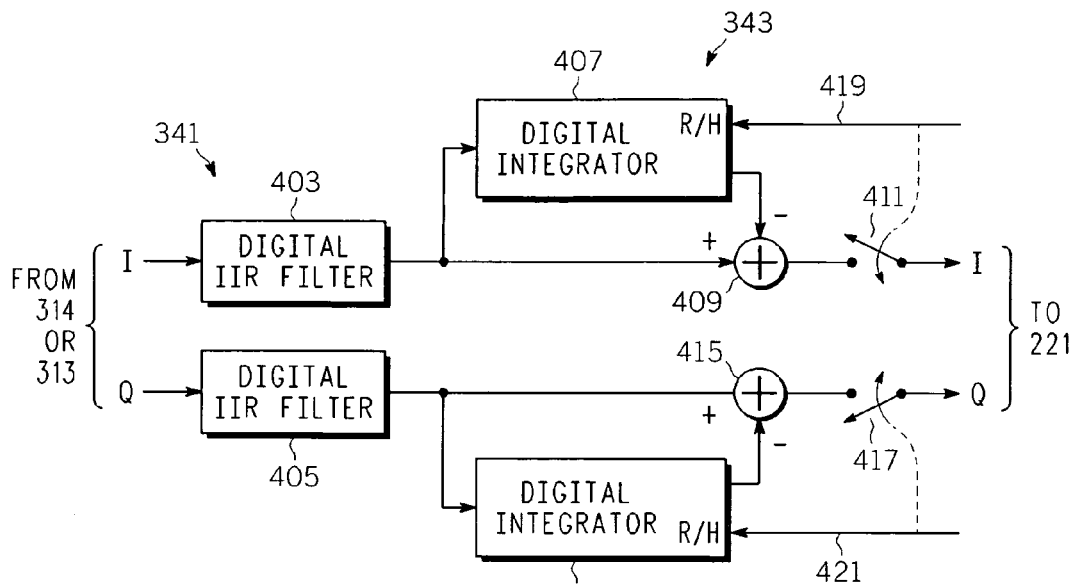
FIG. 4 depicts a representative block diagram of a compensation filter that is suitable for use in the FIG. 3 compensator in accordance with one or more embodiments.

Referring to FIG. 4, a representative block diagram of a compensation filter 341 and DC Offset corrector 343 that is suitable for use in the FIG. 3 compensator 111 will be discussed and described. FIG. 4 shows digital filters 403, 405 with I and Q inputs from digital filters 314 (alternatively ADC 313). In some embodiments these filters are infinite impulse response (IIR) filters with a generally known geometry or architecture, however these filters need to be configured to have a frequency response that is substantially the inverse (in both amplitude and phase) of the corresponding response of the direct conversion radio 101. In some direct conversion radios the DC notch or response can be reasonably well modeled as a first order high pass filter with a 3 dB point around 1 KHz. Rather than an IIR filter, a finite impulse response (FIR) filter can be used. FIR filters using 16 bit coefficients appear to provide reasonable results.

The DC offset corrector 343 can be implemented in various forms. One consideration is that the DC offset corrector can not create or recreate any DC distortion, i.e., can not create any notch response near DC (0 Hz). The embodiment depicted in FIG. 4 utilized the TDMA (time division multiple access) nature of a DVBH signal. In this instance the desired signal is sent during a particular time slot and the baseband receiver and specifically the DC offset corrector can take advantage of this. The DC offset corrector 343 determines or estimates any DC offset during time slots when the baseband receiver is not attempting or required to receive and process an OFDM signal and then applies or removes this estimated DC offset during those time slots when the desired OFDM signal is present and needs to be processed.

This is accomplished using a digital integrator 407 (digital low pass filter with a low corner frequency), a summer 409 and a switch 411 all intercoupled as shown for the I path and a corresponding integrator 413, summer 415, and switch 417 for the Q path. The switches 411, 417 remain open until just before a time slot when a desired OFDM signal is or will be present. A control signal, e.g., from a general purpose controller responsible for timing, is used to close the switched 411, 417 as well as apply a hold signal 419, 421 to the respective integrators 407, 413. At the time just before this desired time slot the switches are closed (and the output of the integrators is held constant via the run signal 419, 421) thus coupling the output of the summers to the AFC 321. The integrators 407, 413 essentially determine a long term average (i.e., DC value or offset) of the signal that is being received by the direct conversion radio and remove this DC offset at the summers 409, 415. Other embodiments of the DC offset corrector (not shown) can utilize a DC offset value provided from the direct conversion radio (DCOC 311) where this DC offset is appropriately scaled and if needed converted to a digital value. This digital value, i.e., resultant DC offset, is then subtracted from the output of the compensation filters 403, 405, e.g., via summers. Note that the switches in many embodiments are merely a logical construct indicating that the output of the summers is not utilized while the integrators are determining the average. Functionally, the purpose of the switches is often accomplished without need for any switches, since subsequent functions (FFT, etc) are disabled until needed for demodulation.

Figure 5:
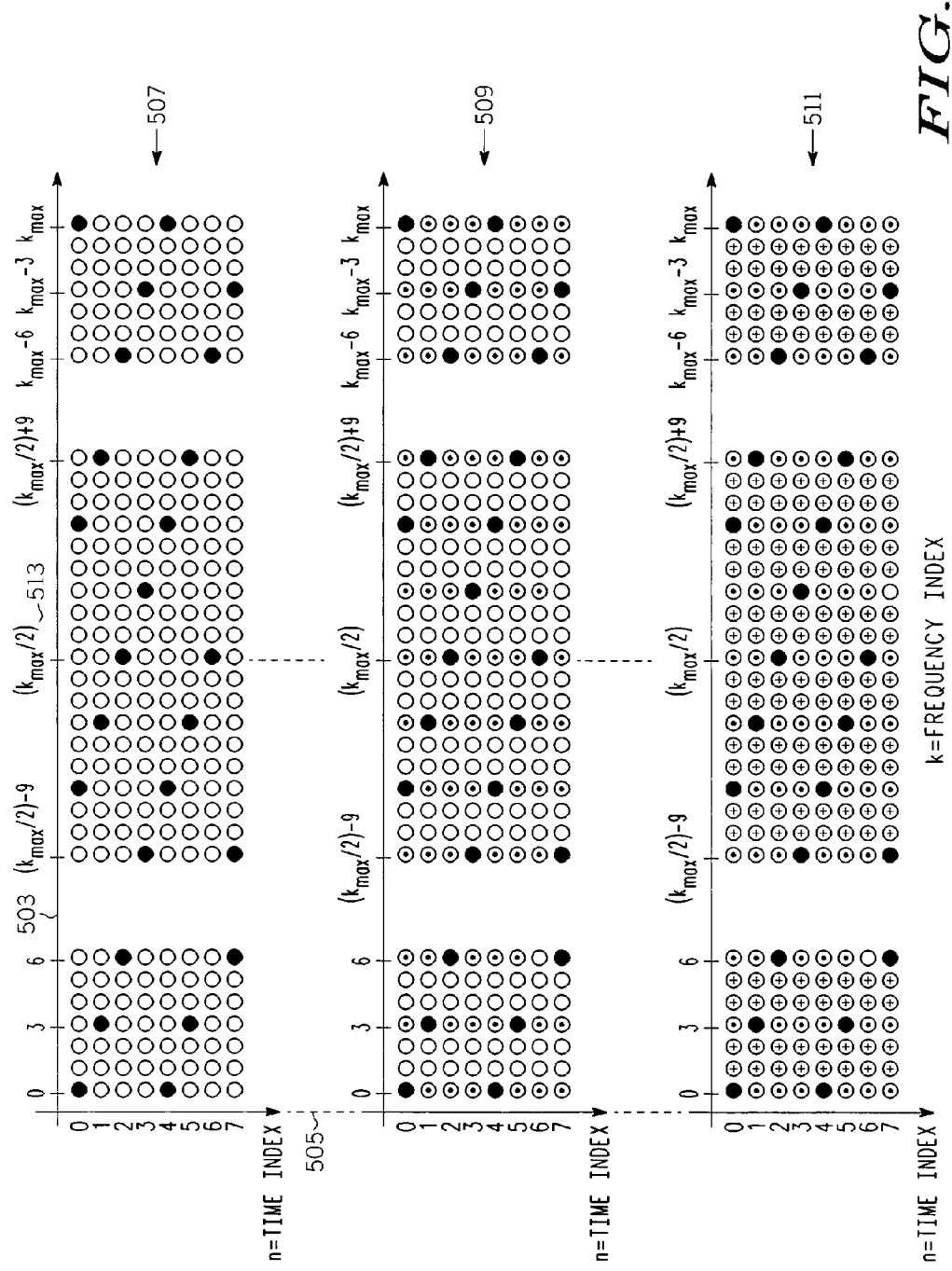
FIG. 5 depicts an exemplary diagram of scattered pilot symbols for an OFDM signal and the results of time and frequency interpolation.

Referring to FIG. 5, an exemplary diagram of scattered pilot symbols for an OFDM signal, e.g., DVBH OFDM signal, and the results of time and frequency interpolation will be discussed and described. FIG. 5 shows a diagram of subcarriers versus time with the subcarrier index k ranging from k=0 to k=$k_{max}$ on the horizontal axis 503 and a time index n on the vertical axis 505. Generally as is known for OFDM systems or air interface standards and more specifically DVBH systems or modems, "scattered" pilot symbols are used to estimate a channel response (magnitude and phase response of the channel). The channel response includes transmitter and receiver frequency responses as well as multipath channel frequency response and is typically estimated, e.g., by the channel estimator 329, for each subcarrier.

Pilot symbols are known or defined symbols with a known amplitude and phase and these are inserted on various subcarrier frequencies at various time intervals by the transmitter, e.g., as shown via the symbol map 507. In DVBH and other systems these pilot symbols are transmitted on every third subcarrier (k=0, 3, 6, . . . ) and for a given subcarrier that includes pilot symbols every fourth symbol is a pilot symbol (n=0, 4, 8, . . . ) for the $0^{th}$ subcarrier. Note that the presence of pilot symbols is staggered over time so that adjacent pilot bearing subcarriers include the pilot symbols at a different time index as depicted. Note that the pilot symbols are shown as solid circles whereas normal data symbols are shown as open circles in FIG. 5. With this arrangement at any one time slot, every $12^{th}$ subcarrier includes a pilot symbol, e.g., for n=0, pilot symbols are present in subcarrier k=0, 12, . . . ; for n=2, pilot symbols are present in subcarrier k=3, 15, . . . .

The OFDM demodulator processes the magnitude and phase of these scattered pilot symbols and this indicates how the magnitude and phase of the pilot symbol was changed by the channel. The channel estimator 329 can interpolate, e.g., by 4, in the time domain to provide an estimate of a pilot symbol (magnitude and phase), i.e., estimate of the channel, for each time slot as shown by the symbol map 509, where circles with a dot indicate interpolated (over time) pilot symbols. This interpolation over time is typically performed using a 23 tap interpolation filter. Thus for k=0, pilot symbols are received at n=0, 4, 8, etc. and by interpolating between the pilot symbols that are transmitted, conditions for the channel as reflected on subcarrier k=0 can be estimated for other time indices n, i.e., for k=0, the interpolated pilot symbols are shown at n=1, 2, 3, 5, 6, 7, etc.

After interpolation over time, the channel estimator can interpolate over k (frequency) using any transmitted pilot symbol as well as the interpolated (over time) pilot symbols and thus provide interpolated pilot symbols, i.e., estimate of the channel, for all k and all n as reflected by the symbol map 511. Note that the interpolated conditions (pilot symbols) over frequency are shown as a circle enclosing a + symbol.

As discussed with reference to FIG. 2 and that particular ODFM air interface embodiment, the subcarrier identified as $k_{max}/2$ 503 will be at 0 Hz when the frequency error for a direct conversion radio or receiver is 0 Hz. Note that the $k_{max}/2$ subcarrier is one of the subcarriers that periodically has pilot symbols inserted. Also note that a frequency error can encompass several subcarriers. For example, if the transmitter frequency error or stability is 1 part per million (ppm) and the receiver stability is 5 ppm a total frequency error between the transmitter and receiver can be 6 ppm. At a carrier frequency of 1 GHz this frequency error can be +/−6 KHz and thus the subcarrier that is centered in the DC distortion with a spacing of 1 KHz can be +/−6 subcarriers from $k_{max}/2$ and even at an error of +/−3 KHz any one of three different subcarriers that are pilot symbol carriers can be centered in the DC distortion. As earlier noted, phase distortion due to the low frequency response (resulting from, e.g., DC notch filter or very low frequency high pass filter) of various embodiments of the direct carrier radio can effect 5-10 subcarriers either side of the subcarrier that is centered in the DC distortion. Thus it is likely that an adverse impact on one or more pilot symbols in the OFDM signal due to DC distortion will be present. It should be noted that the particular location of pilot bearing subcarriers and their respective locations relative to 0 Hz will vary with varying OFDM standards and operating modes and the above example is merely provided in order to show or suggest an approach for determining whether a problem may be present in a particular system.

Figure 6:
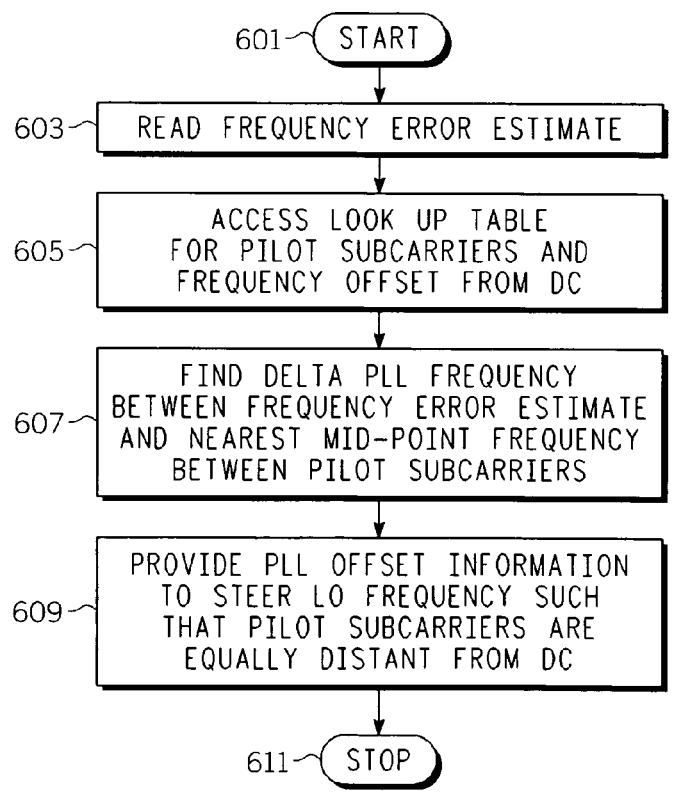
FIG. 6 illustrates an exemplary flow chart of methods for steering a local oscillator to reduce the effect of DC distortion in accordance with one or more embodiments.

Referring to FIG. 6, an exemplary flow chart of methods for steering a local oscillator to reduce the effect of DC distortion will be discussed and described. With FIG. 5 in mind, FIG. 6 shows one technique or method that can be implemented or practiced by the offset generator 347. As noted above the offset generator is configured to steer a local oscillator frequency, i.e., frequency of the signal supplied by the PLL 309, and thus change the location in frequency and the location within the OFDM subcarriers of the DC distortion. In view of the discussions herein those of ordinary skill will be able to provide a circuit or other hardware arrangement suitable for practicing the method or providing similar results to the method. In one embodiment a processor (some capacity from the baseband receiver processor or the like) and suitable software instructions are used to perform the requisite operations. Generally the method determines where the local oscillator frequency is at, where the pilot symbol bearing subcarriers are located in frequency, and provides information to the PLL that allows or enables steering the VCO (local oscillator frequency) such that subcarriers with pilot symbols are moved away from the DC distortion, at least as much as plausible or practical.

The method 600 begins at 601 and reads the frequency error estimate at 603. The frequency error estimate is equal to the known channel frequency less the local oscillator frequency. Note that the local oscillator frequency is the result of selecting particular divisor ratios for the PLL as is generally known. Thus frequency errors are due to either a transmitter or receiver reference oscillator frequency error due to make tolerances, environmental (temperature or the like) variations, or aging phenomenon. A look up table or the like is then accessed at 605 to determine the location relative to 0 Hz where subcarriers that have pilot symbols are located for the present mode of operation. For example, referring to the embodiment of FIG. 5, the pilot subcarriers are at 0 Hz, +/−3 KHz, etc. Other OFDM systems that use scattered pilots for channel estimation may have pilot subcarriers at different locations and at different spacing. Then at 607 a PLL frequency delta is determined between the frequency error estimate from 603 and the nearest midpoint frequency between pilot subcarriers. Next PLL offset information is provided at 609 (i.e. increment or decrement present divisor ratio by a certain amount or new divisors, etc.) in order to move or steer the local oscillator or VCO frequency such that pilot subcarriers are equally distant from the DC location, i.e., equally distant from the DC distortion and the method ends at 611. Note that the method can be repeated as often as deemed appropriate.

Using this method and by way of example with reference to FIG. 5 the local oscillator should be steered such that the DC distortion is located at +/−1.5 KHz from the pilot symbol carrying subcarrier that is closest to the value of the frequency error estimate. Suppose the frequency error estimate were 0 Hz, the method could result in steering the local oscillator such that the resultant frequency error was +/−1.5 KHz assuming a 1 KHz subcarrier spacing and a 3 KHz pilot subcarrier spacing. Similarly if the frequency error was +3 KHz, the local oscillator should be steered in a negative direction to +1.5 KHz frequency error, i.e., midway between $k_{max}/2+1$ and $k_{max}/2+2$. It may be appropriate to update the offset information whenever the frequency error at 345 changes by a predetermined amount taking into consideration any frequency error caused by the steering operations. In other embodiments, the information can be updated for each change in time index, assuming the PLL dynamics are sufficient to allow the direct conversion radio to settle to a new frequency, etc. In this case for example assuming 0 Hz frequency error, the local oscillator should be left alone in time slot 0, steered by +3 KHz in time slot 1, and steered by +/−6 KHz in time slot 2, etc. Note that in OFDM systems that are based on a TDMA approach, e.g., DVBH systems, the steering can be done during TDMA time slots prior to the TDMA time slot of interest.

Figure 7:
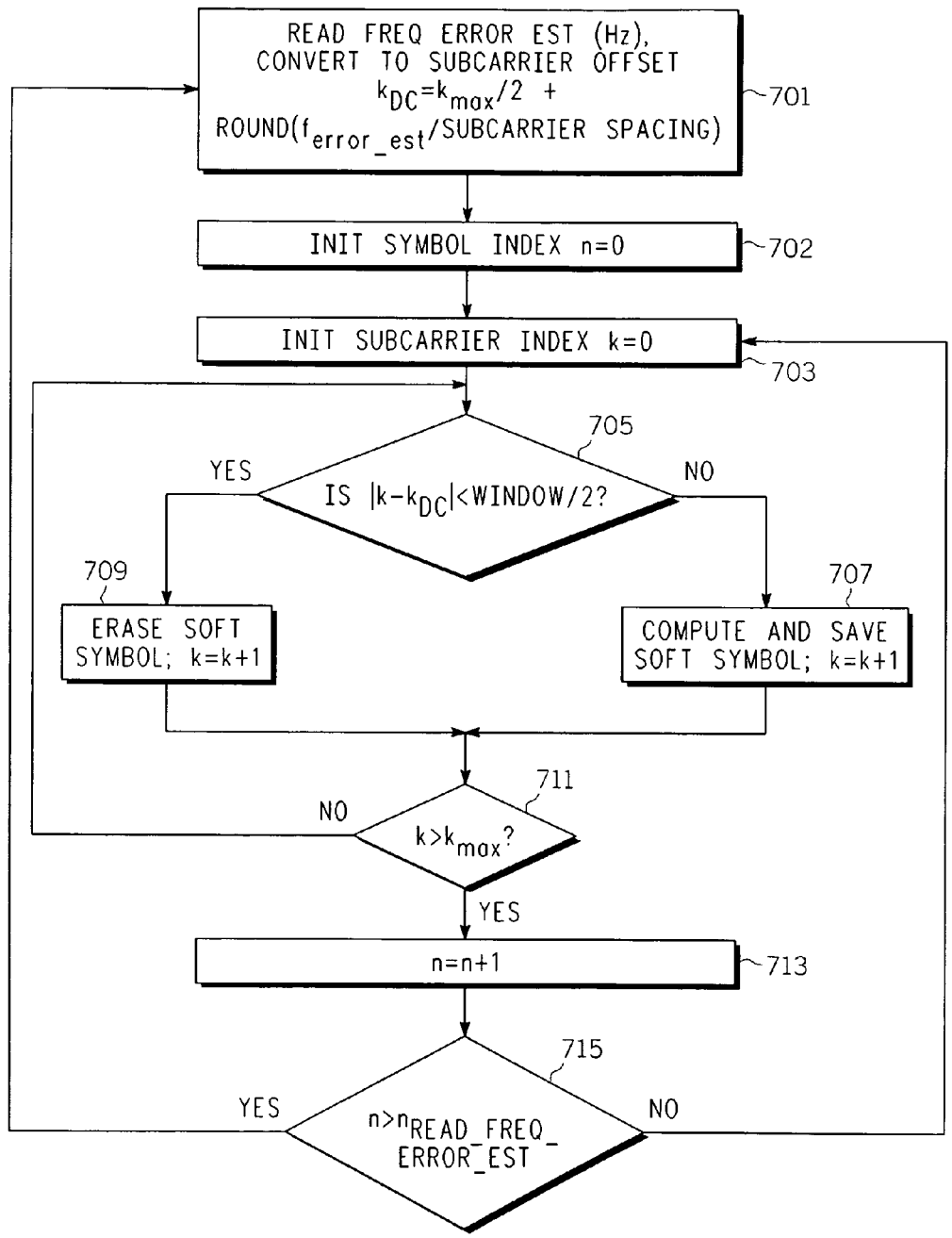
FIG. 7 illustrates an exemplary flow chart of methods of selectively erasing soft symbols that are impacted by DC distortion in accordance with one or more embodiments.

Referring to FIG. 7, an exemplary flow chart of methods of selectively erasing soft symbols that are impacted by DC distortion in accordance with one or more embodiments will be discussed and described. With FIG. 5 in mind, FIG. 7 shows one technique or method that can be implemented or practiced by the symbol de-mapper 331. As noted above the symbol de-mapper is configured to set soft symbols to an erasure when the soft symbols are from subcarriers that have been subjected to the DC distortion from the direct conversion radio. In view of the discussions herein those of ordinary skill will be able to provide a circuit or other hardware arrangement suitable for practicing the method or providing similar results to the method. In one embodiment a processor (some capacity from the baseband receiver processor or the like) and suitable software instructions are used to perform the requisite operations. Generally the method determines where the local oscillator frequency is at, which if any of the subcarriers are located in frequency so as to be impacted by the DC distortion, and if so soft symbols from these subcarriers are set to an erasure. The method 700 allows the symbol de-mapper and more specifically the FEC 113 to take advantage of the notion that no information (an erasure) is normally less harmful to overall error rates than bad or corrupted information.

The method 700 begins by reading the frequency error estimate at 345 and converting this to a corresponding frequency or channel index 701, $k_{DC}=k_{max}/2+$ round (error estimate/subcarrier spacing), i.e., $k_{max}/2+$ number of subcarriers represented by the frequency error rounded to the nearest number of subcarriers. For example, if the frequency error was 3.2 KHz and the subcarrier spacing was 1 KHz, then $k_{DC}=k_{max}/2+$ round (3.2 KHz/1 KHz) or $k_{DC}=k_{max}/2+3$ or if the frequency error was the same but the subcarrier spacing was 4 KHz then $k_{DC}=k_{max}/2+1$. Next the symbol or time index n is initialized or set to 0 at 702 and then the frequency or subcarrier index k is initialized or set to 0 at 703. Next at 705, the method determines whether the magnitude of the difference between the current subcarrier index k and $k_{DC}$ is less than a predetermined Window/2. This Window is programmable and will depend on the characteristics of the DC distortion as well as the mode of operation, i.e., subcarrier spacing, etc., but generally reflects the span of subcarriers that are impacted by the DC distortion from the direct conversion radio or receiver. Given the discussion herein and a particular ODFM and direct conversion radio embodiment one of ordinary skill will be readily capable of determining an appropriate window size.

When the subcarrier corresponding to k is within the Window/2, the soft symbol is erased and k is incremented at 709 and otherwise the soft symbol is saved and k is incremented at 707. Then in either case k is tested or compared to $k_{max}$ at 711 and if not greater the method returns to 705 and repeats from there and if k is greater than $k_{max}$ at 711 the method proceeds to 713 where n is incremented and then to 715, where n is compared to a value indicative of whether the frequency error should be updated. If the frequency error does not need to be updated or read the method loops to 703 where the subcarrier index k is re-initialized and the method is repeated from there for a new symbol n and if the frequency error needs to be updated, the method loops to 701 where the frequency error is updated and repeats from there. The discussion above with regard to FIG. 6 and updating the frequency error applies in a similar manner to the method 700.

It has been found in one ODFM embodiment that as many as 30 subcarriers can essentially be erased with as little as a ¼ dB impact on error rate performance as compared to performance that might be expected without any DC distortion. This is due at least in part to the fact that soft bits that are erased are spread out via symbol de-interleaving (de-interleaves data across subcarriers in a symbol) and bit-level de-interleaving both of which occur prior to the soft-bit convolutional decoding in the FEC. Given that the erased symbols are significantly de-interleaved and convolutional coding is used, erased symbols do much less harm to the error correction process (Viterbi algorithm) that corrupted symbols.

Figure 8:
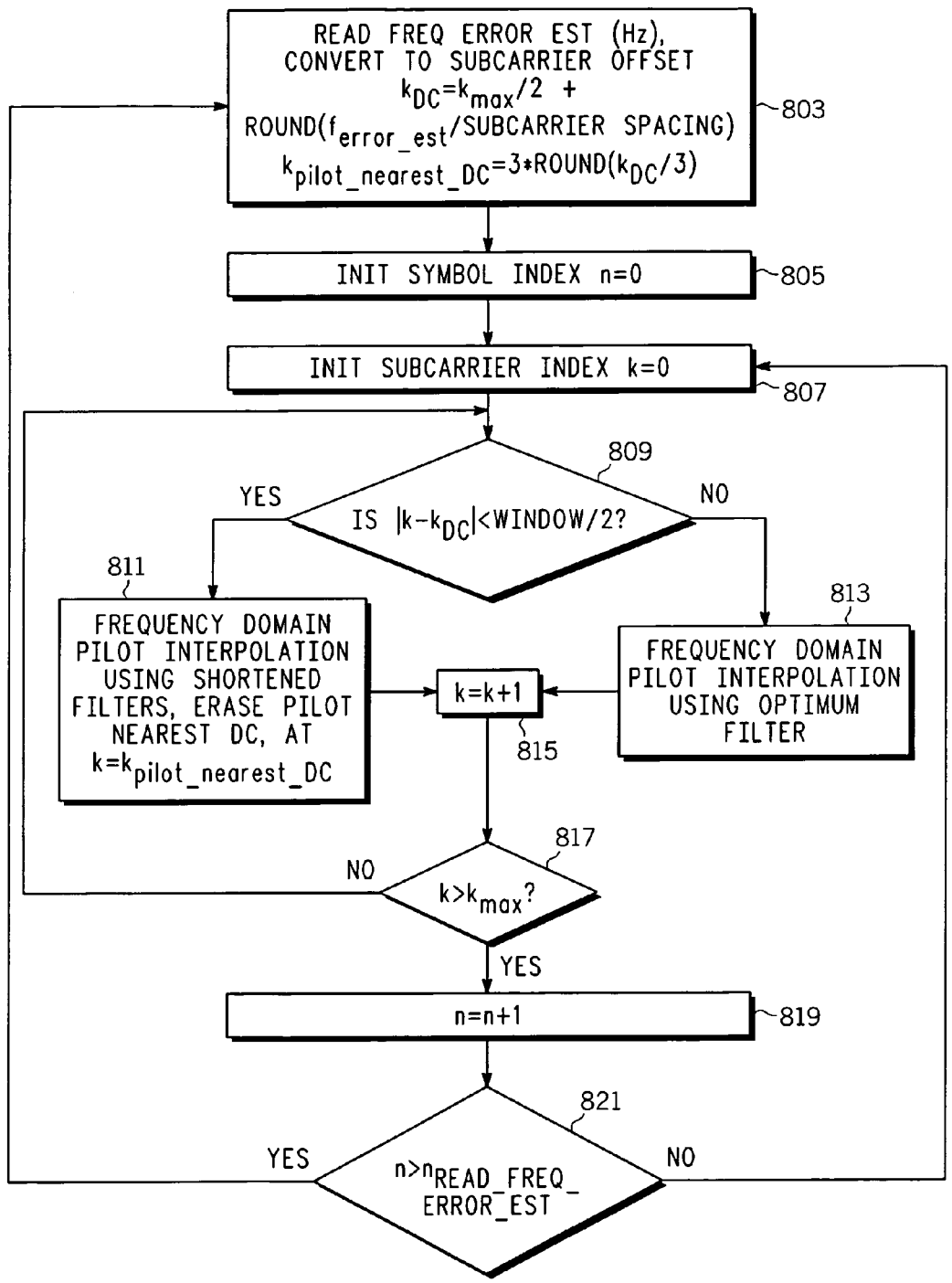
FIG. 8 shows an exemplary flow chart of methods of selecting channel estimation filters dependent on a relative frequency location of subcarriers and DC distortion in accordance with one or more embodiments.

Referring to FIG. 8, an exemplary flow chart of methods of selecting channel estimation filters dependent on a relative frequency location of subcarriers and DC distortion in accordance with one or more embodiments will be discussed and described. With FIG. 5 in mind, FIG. 8 shows one technique or method that can be implemented or practiced by the selector or filter selector 351 that is associated with the channel estimator 329 and corresponding circuitry or functionality. As noted above the selector 351 is configured to select one or more channel estimation filters in accordance with subcarrier spacing relative to the DC distortion. In some embodiments pilot symbols that have been impacted by DC distortion from the direct conversion radio are erased before using the channel estimation filters. In view of the discussions herein those of ordinary skill will be able to provide a circuit or other hardware arrangement suitable for practicing the method or providing similar results to the method. In one embodiment a processor (some capacity from the baseband receiver processor or the like) and suitable software instructions are used to perform the requisite operations. Generally the method determines where the local oscillator frequency is at, which if any of the subcarriers are located in frequency so as to be impacted by the DC distortion, and if so a shortened filter (interpolation filter) is selected for channel estimation and in some embodiments pilot symbols from these subcarriers are set to an erasure prior to the interpolation. The method 800 allows the channel estimator to use only pilot symbols (actual or interpolated over time pilot symbols) that are not corrupted by the DC distortion, where the trade off is using a chosen filter that may be sub-optimum for situations (subcarriers that are sufficiently distant from the DC distortion) where there is no corruption.

FIG. 8 begins at 803 by reading estimated frequency error at 345 and converting this to a subcarrier offset, i.e., corresponding frequency or channel index, $k_{DC}=k_{max}/2+$round (frequency error estimate/subcarrier spacing), i.e., $k_{max}/2+$ the number of subcarriers represented by the frequency error rounded to the nearest number of subcarriers. The location of the pilot subcarrier closest to DC is found by rounding $k_{DC}/3$ with the result multiplied by 3, $k_{pilot\_nearest\_DC}=(3)$round $(k_{DC}/3)$ noting that in the specific embodiment pilot subcarriers are located at every $3^{rd}$ k for k=0, 1, . . . $k_{max}$. For example, if the frequency error was 3.2 KHz, the subcarrier spacing was 1 KHz, and the pilot subcarrier spacing was 3 KHz, then $k_{DC}=k_{max}/2+$ round (3.2 KHz/1 KHz)} or $k_{DC}=k_{max}/2+3$ and $k_{pilot\_nearest\_DC}=3$round$(k_{DC}/3)=k_{max}/2+3$. If the frequency error was the same but the subcarrier spacing was 4 KHz and the pilot subcarrier spacing was 12 KHz then $k_{DC}=k_{max}/2+1$ and $k_{pilot\_nearest\_DC}=k_{max}/2$. In these instances the nearest subcarrier that has pilot symbols inserted periodically has an index of $k_{max}/2+3$ and $k_{max}/2$, respectfully. Next the symbol or time index n is initialized or set to 0 at 805 and the frequency or subcarrier index k is initialized or set to 0 at 807. Next at 809, the method determines whether the magnitude of the difference between the current subcarrier index k and $k_{DC}$ is less than a predetermined Window/2. This Window is programmable and will depend on the characteristics of the DC distortion as well as the mode of operation, i.e., subcarrier spacing, etc., but generally reflects the span of subcarriers that are impacted by the DC distortion from the direct conversion radio or receiver and the number or span of subcarriers that are used or impacted by the interpolation filter that is normally used (number of taps or length of the normal interpolation filter). As will be discussed further with reference to FIG. 9, when a 23 tap interpolation filter is used, the window should be chosen with a width of twice the number of subcarriers represented by the frequency error, i.e., $k_{DC}-k_{max}/2$, plus 12 (one half the number of taps rounded up).

When the subcarrier corresponding to k is within the Window/2 at 809, a channel estimation filter, e.g., often a shortened filter, is selected in accordance with the subcarrier spacing relative to the DC distortion and frequency domain interpolation is performed with that shortened filter and any pilot symbols near the DC distortion, specifically the pilot symbols included with $k_{pilot\_nearest\_DC}$ can be erased 811. Then k is incremented at 815. Otherwise when k is not within the Window/2 at 809, the normal "optimum" filter, e.g., a 23 tap interpolation filter, is selected and frequency domain pilot interpolation is performed 813 and k is incremented at 815. Then in either case k is tested or compared to $k_{max}$ and if not greater the method returns to 809 and repeats from there and if k is greater than $k_{max}$ the method proceeds to 819 where n is incremented and then to 821, where n is compared to a value indicative of whether the frequency error should be updated. If the frequency error does not need to be updated or read the method loops to 807 where the subcarrier index k is re-initialized and the method is repeated from there for a new symbol n and if the frequency error needs to be updated, the method loops to 803 where the frequency error is updated and repeats from there. The discussion above with regard to FIG. 6 and updating the frequency error applies in a similar manner to the method 800.

Figure 9:
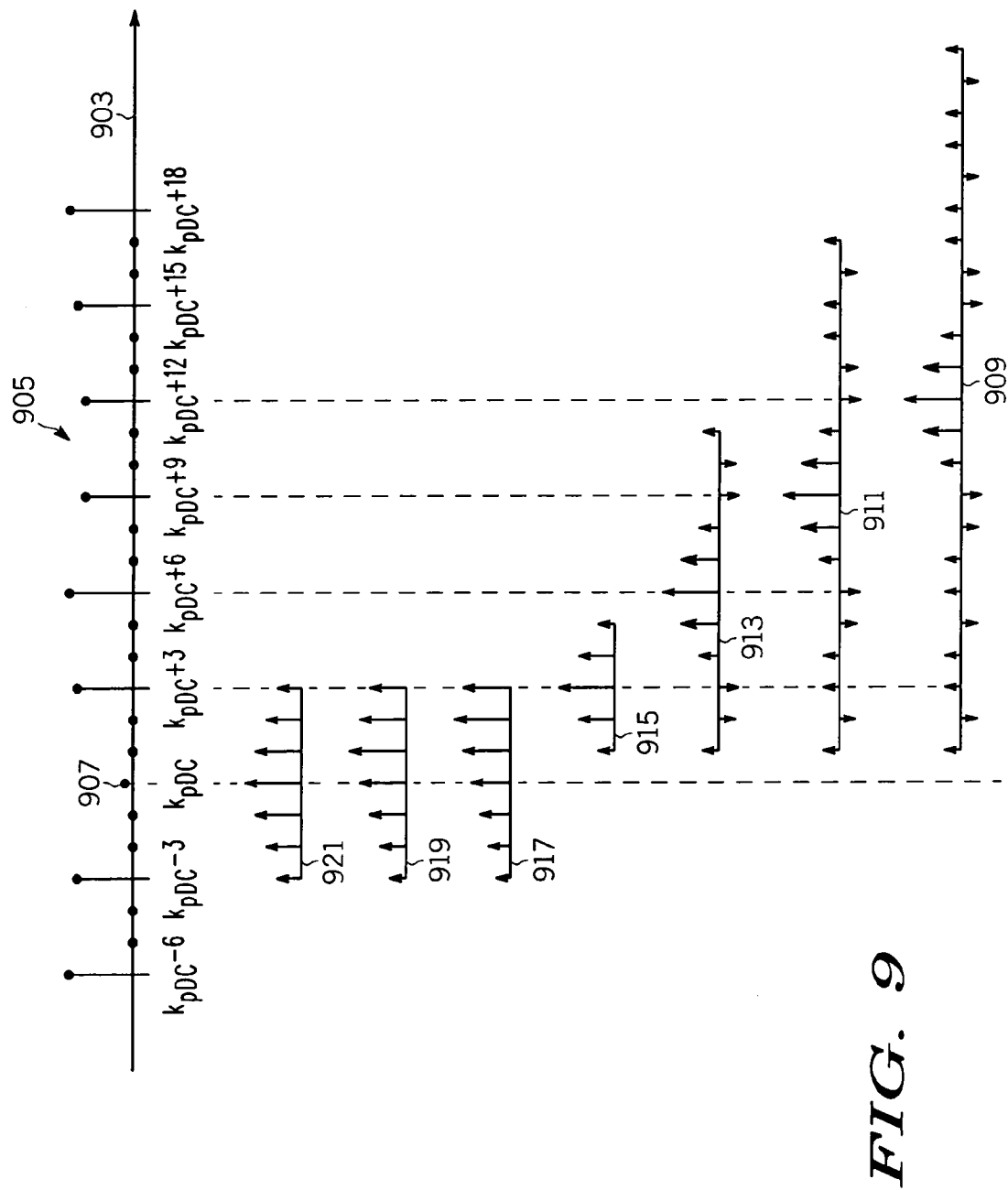
FIG. 9 shows in a representative manner one or more filters that are selected in accordance with the methods of FIG. 8 and in accordance with one or more embodiments.

Referring to FIG. 9, one or more filters that are selected in accordance with the methods of FIG. 8 and in accordance with one or more embodiments will be discussed and described. FIG. 9 shows frequency along the horizontal axis 903 with representative pilots 905 from pilot subcarriers with one such pilot 909 set to zero (I and Q values are set to 0). Pilot 909 has a k index denoted $k_{pDC}$ and is the pilot that was the nearest to the DC distortion as determined from FIG. 8. Other pilots are spaced at every third subcarrier and have a k index denoted as $k_{pDC}-6$, $k_{pDC}-3$, $k_{pDC}$, $k_{pDC}+3$, . . . , $k_{pDC}+18$. Note that the representative pilots are shown for a single time index n and that the location of the pilots can vary with the particulars of the OFDM air interface that is being used. Some of the pilots shown are pilots that were received while others are pilots that were found via interpolation over time.

Generally sufficient channel estimation performance for present DVBH systems required the use of a 23 tap filter for time-domain interpolation as well as a 23 tap filter for frequency domain interpolation of the scattered pilot subcarriers. Note that at band edges, i.e., as k approaches 0 or $k_{max}$ shortened filters are presently used. In the frequency domain a 23 tap filter will span at most 8 pilots where the remaining pilots or values are input as 0s, i.e., unknowns, to the interpolator. As a result if a particular pilot was corrupted, i.e., distorted, by the DC response of the direct conversion radio, it could impact the magnitude or phase estimates on up to 12 subcarriers on either side of this pilot. Thus it is possible to improve the pilots that result from interpolation by insuring that a pilot that may be corrupted is not used to estimate the other pilots.

Thus so long as the subcarrier is far enough from the distorted or now zeroed pilot $k_{pDC}$ the normal 23 tap filter and 3× interpolation can be used. As shown in FIG. 9 the normal filter 909 can be used for all k outside of $k_{pDC}-12$ through $k_{pDC}+12$. Between subcarrier offsets from $k_{pDC}$, positive or negative, of 9-11 a 17 tap interpolation filter 911 and 3× interpolation can be used. For subcarrier offsets of 6-8 an 11 tap interpolation filter 913 and 3× interpolation can be used. For subcarrier offset of 3-5 a 5 tap interpolation filter 915 and 3× linear interpolation can be utilized. For offsets from −2 to +2 6× linear interpolation and a 7 tap interpolation filter that spans the pilots at +3 and −3 can be used. Note that for +2 the linear 7 tap interpolation filter 917 is aligned as shown. This same filter where the alignment is reversed would be used for −2. For +1 the 7 tap filter 919 aligned as shown is used and this filter where the alignment is reversed can be used for −1. The 7 tap filter 921 is also used for interpolating the pilot at $k_{pDC}$ as shown.

Another approach can be used when the pilot at $k_{pDC}$ is not zeroed. In this instance the filters 909, 911, 913, and 915 are used as discussed above for the k indices noted above. Furthermore, the 5 tap 3× linear interpolation filter is also used for $k_{pDc}$ and offsets of plus or minus 1 and 2. In this case any corruption due to the pilot at $k_{pDC}$ is limited to +/−2 subcarriers.

Referring to FIG. 10 a representative embodiment of a method of reducing the effects or impact of DC distortion in an OFDM signal in accordance with various embodiments will be discussed and described. It will be appreciated that this method uses many of the inventive concepts and principles discussed in detail above and thus this description will be somewhat in the nature of a summary with various details generally available in the earlier descriptions. This method can be implemented in one or more of the structures or apparatus described earlier or other similarly configured and arranged structures.

The method 1000 is directed to reducing effects resulting from direct current (DC) distortion in an Orthogonal Frequency Division Multiplexing (OFDM) signal, e.g., where the OFDM signal is provided from a direct conversion radio. The method begins at 1003 and includes adaptively modifying the OFDM signal to provide a compensated OFDM signal. The adaptively modifying the OFDM signal can take various forms and in one or more embodiments further comprises compensating the OFDM signal using a compensation filter to reduce the DC distortion. In some embodiments this can include substantially removing attenuation and a phase shift due to a high pass or notch filter response of the direct conversion radio and estimating a DC offset prior to (using an earlier OFDM packet) and then applying the estimate while an OFDM packet that is of interest is being received. In other embodiments the adaptively modifying the OFDM signal further comprises steering a local oscillator frequency of the direct conversion radio to change the location in frequency of the DC distortion. The steering can be responsive to an estimate of frequency error and the local oscillator frequency of the direct conversion radio can be steered such that adjacent pilot subcarriers in the OFDM signal are substantially equally distant from zero (0) hertz.

The method 1000 includes demodulating the compensated OFDM signal to provide a demodulated OFDM signal 1005 and post processing the demodulated OFDM signal to provide data 1007 as are generally known. Note that the adaptively modifying the OFDM signal reduces an error rate in the data due to the DC distortion. The method of FIG. 10 may be repeated as needed, e.g., with each new ODFM symbol or frame.

Referring to FIG. 11 a representative embodiment of a method of reducing the effects or impact resulting from DC distortion in an OFDM signal in accordance with various embodiments will be discussed and described. It will be appreciated that this method uses many of the inventive concepts and principles discussed in detail above and thus this description will be somewhat in the nature of a summary with various details generally available in the earlier descriptions. This method can be implemented in one or more of the structures or apparatus described earlier or other similarly configured and arranged structures. The method of FIG. 11 may be repeated as needed, e.g., with each new ODFM symbol or frame.

The method 100 is directed to reducing effects resulting from direct current (DC) distortion in an Orthogonal Frequency Division Multiplexing (OFDM) signal, where the OFDM signal is provided from a direct conversion radio. The method begins at 1103 by demodulating the OFDM signal to provide a demodulated OFDM signal. Next at 1105 the method includes adaptively modifying the demodulated OFDM signal to compensate for the DC distortion in the demodulated OFDM signal and then at 1107 post processing the demodulated OFDM signal, as compensated, to provide data.

The adaptively modifying the demodulated OFDM signal can take various forms in accordance with various embodiments including setting symbols in the demodulated ODFM signal to an erasure when the soft symbols are from subcarriers that have been subjected to the DC distortion. This may also include estimating a frequency error and determining, based on the frequency error, what subcarriers have been subjected to the DC distortion.

The adaptively modifying the demodulated OFDM signal in other embodiments includes selecting channel estimation filters where one or more particular filters are selected in accordance with a subcarrier spacing relative to the DC distortion. This may also include estimating a frequency error for the ODFM signal and then selecting channel estimation filters, based on the frequency error, where the channel estimation filters have a filter length that is shorter when a subcarrier is closer to the DC distortion than when the subcarrier is further from the DC distortion. Note that erasing, based on the frequency error, pilot symbols that have been impacted by the DC distortion before using the channel estimation filters to determine characteristics of a channel for the OFDM signal may also improve performance.

It will be appreciated that the above described methods and structures can be implemented in one or more integrated circuits. For example, many or all of the functions can be implemented in a baseband receiver integrated circuit or processor associated with the receiver.

The processes, apparatus, and systems, discussed above, and the inventive principles thereof are intended to and can alleviate much of the adverse effect of DC distortion on OFDM or the like signals that occurs in a direct conversion radio or receiver issues caused by prior art techniques. Using these principles of modifying the OFDM signal prior to OFDM demodulation or modifying the demodulated OFDM signal can virtually eliminate the reduction in error rates that may otherwise occur with relatively minimal costs and the like. As might be expected the DC distortion effects are more pronounced on more complex modulation approaches, e.g., 16 QAM, etc, and the compensation approaches noted above are similarly more effective for these modulation approaches. For example, simulation experiments have shown 1.4 dB degradation in CCBER resulting from DC distortion. Simulation also shows that implementation of one or more of the above described techniques for reducing effects of DC distortion can dramatically improve the degradation from 1.4 dB to less than 0.1 dB in a 16 QAM modulation OFDM system.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A baseband receiver configured to mitigate effects of direct current (DC) distortion and process an Orthogonal Frequency Division Multiplexing (OFDM) signal as provided from a direct conversion radio, the baseband receiver comprising:

an OFDM demodulator configured to demodulate the OFDM signal;

a post processor coupled to the OFDM demodulator and configured to provide symbols corresponding to the OFDM signal; and a compensator coupled to at least one of the OFDM demodulator and the post processor and configured to reduce error rates out of the baseband receiver that result from DC distortion in subcarrier amplitude and phase in the direct conversion radio, wherein the compensator further comprises a selector responsive to an estimate of frequency error and configured to select channel estimation filters where one or more particular filters are selected in accordance with a subcarrier spacing relative to the DC distortion and wherein the compensator is configured to erase pilot symbols that have been impacted by the DC distortion before using the channel estimation filters to determine characteristics of a channel for the OFDM signal.

2. The baseband receiver of claim 1 wherein the compensator further comprises a compensation filter coupled to the OFDM signal and operable to reverse one or more DC distortion components with an output of the compensation filter coupled to an input of the OFDM demodulator.

3. The baseband receiver of claim 2 wherein the compensation filter further comprises a DC compensation filter configured to substantially remove attenuation due to a high pass response of the direct conversion radio and a DC offset corrector where the DC offset corrector estimates a DC offset prior to and then applies the estimate while an OFDM packet is received.

4. The baseband receiver of claim 1 wherein the compensator further comprises an automatic frequency controller (AFC) and an offset generator inter coupled and collectively configured to steer a local oscillator frequency of the direct conversion radio so as to change the location in frequency of the DC distortion.

5. The baseband receiver of claim 4 wherein the offset generator is responsive to an estimate of frequency error from the AFC and further configured to steer the local oscillator frequency such that adjacent pilot subcarriers in the OFDM signal are spared away from zero (0) hertz.

6. The baseband receiver of claim 1 wherein the compensator further comprises a symbol de-mapper that is configured to set soft symbols to an erasure when the soft symbols are from subcarriers that have been subjected to the DC distortion.

7. The baseband receiver of claim 6 wherein the symbol de-mapper is coupled to a frequency error estimate and the frequency error estimate is used to determine what subcarriers have been subjected to the DC distortion.

8. The baseband receiver of claim 1 wherein the one or more particular filters are selected to have a filter length that is shorter when a subcarrier is closer to the DC distortion than when the subcarrier is further from the DC distortion.

9. A method of reducing effects resulting from direct current (DC) distortion of amplitude and phase in a signal executed by a baseband receiver, the signal provided from a direct conversion radio, the method comprising:

adaptively modifying the signal to provide a compensated signal;

demodulating the compensated signal to provide a demodulated signal; and post processing the demodulated signal to provide data, where the adaptively modifying the signal reduces an error rate in the data due to the DC distortion of amplitude and phase in the signal as caused by the direct conversion radio, wherein the adaptively modifying the signal further comprises compensating the signal using a compensation filter, selected in accordance with a subcarrier spacing relative to the DC distortion, to reduce the DC distortion, and substantially removing attenuation due to a high pass response of the direct conversion radio and estimating a DC offset prior to and then applying the estimate while a packet is received.

10. The method of claim 9 wherein the adaptively modifying the signal further comprises steering a local oscillator frequency of the direct conversion radio to change the location in frequency of the DC distortion.

11. The method of claim 9 wherein the adaptively modifying the signal further comprises steering, responsive to an estimate of frequency error, a local oscillator frequency of the direct conversion radio such that adjacent pilot subcarriers in an orthogonal frequency division multiplexing (OFDM) signal are substantially equally distant from zero (0) hertz.

12. The method of claim 9 wherein the post processing the demodulated signal further comprising adaptively modifying the demodulated signal to further reduce the error rate in the data.

13. A method of reducing effects resulting from direct current (DC) distortion of subcarrier amplitude and phase in an Orthogonal Frequency Division Multiplexing (OFDM) signal executed by a baseband receiver, the OFDM signal provided from a direct conversion radio, the method comprising:

demodulating the OFDM signal to provide a demodulated OFDM signal;

adaptively modifying the demodulated OFDM signal to compensate for the DC distortion of subcarrier amplitude and phase in the demodulated OFDM signal; and post processing the demodulated OFDM signal, as compensated, to provide data wherein the adaptively modifying the demodulated OFDM signal further comprises selecting channel estimation filters where one or more particular filters are selected in accordance with a subcarrier spacing relative to the DC distortion, and wherein the adaptively modifying the demodulated OFDM signal further comprises estimating a frequency error for the ODFM signal and wherein the selecting channel estimation filters further comprises selecting, based on the frequency error, channel estimation filters that have a filter length that is shorter when a subcarrier is closer to the DC distortion than when the subcarrier is further from the DC distortion.

14. The method of claim 13 wherein the adaptively modifying the demodulated OFDM signal further comprises setting symbols in the demodulated ODFM signal to an erasure when the soft symbols are from subcarriers that have been subjected to the DC distortion.

15. The method of claim 14 wherein the adaptively modifying the demodulated OFDM signal further comprises determining, based on the frequency error, what subcarriers have been subjected to the DC distortion.

16. The method of claim 13 wherein the adaptively modifying the demodulated OFDM signal further comprises erasing, based on the frequency error, pilot symbols that have been impacted by the DC distortion before using the channel estimation filters to determine characteristics of a channel for the OFDM signal.

* * * * *